United States Patent
Rigaudon et al.

(10) Patent No.: US 8,119,207 B2
(45) Date of Patent: Feb. 21, 2012

(54) PROCESS AND APPARATUS FOR MANUFACTURING SET CELLULAR CEMENT

(75) Inventors: Michel Rigaudon, Caromb (FR); Jorg Bold, Le Thor (FR); Steven Roy Butler, Le Thor (FR); Eric Millamon, Mondeville (FR)

(73) Assignee: Lafarge Platres, Avignon (FR)

( * ) Notice: Subject to any disclaimer, the term of this patent is extended or adjusted under 35 U.S.C. 154(b) by 1112 days.

(21) Appl. No.: 10/906,143

(22) Filed: Feb. 4, 2005

(65) Prior Publication Data

US 2005/0219938 A1  Oct. 6, 2005

(30) Foreign Application Priority Data

Feb. 24, 2004  (EP) .................................... 04290494

(51) Int. Cl.
B28C 5/14  (2006.01)
(52) U.S. Cl. .................................................. 427/430.1
(58) Field of Classification Search ............... 427/430.1
See application file for complete search history.

(56) References Cited

U.S. PATENT DOCUMENTS

| | | | |
|---|---|---|---|
| 1,660,402 A * | 2/1928 | Thomson ........................... 366/3 |
| 1,687,067 A | 10/1928 | Hinton |
| 2,097,088 A | 10/1937 | Mills |
| 4,676,835 A | 6/1987 | Green et al. |
| 5,004,799 A * | 4/1991 | Kohls et al. .................... 528/389 |
| 5,013,157 A | 5/1991 | Mills et al. |
| 5,085,929 A | 2/1992 | Bruce et al. |
| 5,116,671 A | 5/1992 | Bruce et al. |
| 5,158,612 A | 10/1992 | Savoly et al. |
| 5,240,639 A | 8/1993 | Diez et al. |
| 5,250,578 A | 10/1993 | Cornwell |
| 5,371,989 A * | 12/1994 | Lehnert et al. ............. 52/309.17 |
| 5,575,844 A | 11/1996 | Bradshaw |
| 5,643,510 A | 7/1997 | Sucech |
| 5,660,465 A | 8/1997 | Mason |
| 5,683,635 A | 11/1997 | Sucech et al. |
| 5,714,032 A | 2/1998 | Ainsley et al. |
| 5,879,446 A * | 3/1999 | Patel et al. ..................... 106/781 |
| 5,916,361 A * | 6/1999 | Molloy et al. ................. 106/696 |
| 6,358,311 B1 * | 3/2002 | Arai et al. ...................... 106/808 |
| 6,376,558 B1 * | 4/2002 | Bahner et al. ................... 516/11 |
| 6,443,258 B1 | 9/2002 | Putt et al. |

(Continued)

FOREIGN PATENT DOCUMENTS

DE  2 117 000  10/1971

(Continued)

OTHER PUBLICATIONS

PCT/ISA/210 dated Jul. 8, 2005 and Aug. 9, 2006.

(Continued)

*Primary Examiner* — Timothy Meeks
*Assistant Examiner* — Nathan T Leong
(74) *Attorney, Agent, or Firm* — Buchanan Ingersoll & Rooney PC

(57) ABSTRACT

A process for manufacturing set cellular cement, including the steps of: (i) mixing cementitious material, water, foaming agent and optionally additives into a free flowing slurry having a slump of at least 100 mm; subsequently (ii) injecting and distributing air into the slurry of step (i) to form a cellular slurry; subsequently (iii) casting the cellular slurry of step (ii); and finally allowing the cellular slurry to set. And, an apparatus for carrying out the process.

32 Claims, 5 Drawing Sheets

U.S. PATENT DOCUMENTS

| | | | |
|---|---|---|---|
| 7,033,431 | B2 | 4/2006 | Martin et al. |
| 2006/0175723 | A1 | 8/2006 | Butler et al. |

FOREIGN PATENT DOCUMENTS

| | | | |
|---|---|---|---|
| DE | 31 38 808 | A1 | 4/1983 |
| DE | 3138808 | * | 4/1983 |
| EP | 0 490 160 | A1 | 6/1992 |
| EP | 0 517 207 | A1 | 12/1992 |
| EP | 0 613 764 | B1 | 9/1994 |
| EP | 1 568 671 | A1 | 8/2005 |
| FR | 2 089 457 | | 1/1972 |
| WO | 95/16515 | | 6/1995 |
| WO | 97/23337 | | 7/1997 |
| WO | 02/12141 | A1 | 2/2002 |
| WO | 02/20423 | A2 | 3/2002 |
| WO | 02/24595 | A1 | 3/2002 |
| WO | 02/070427 | A1 | 9/2002 |

OTHER PUBLICATIONS

PCT/IPEA/409 dated May 10, 2006.

PCT/ISA/237 date received Jul. 25, 2005.

* cited by examiner

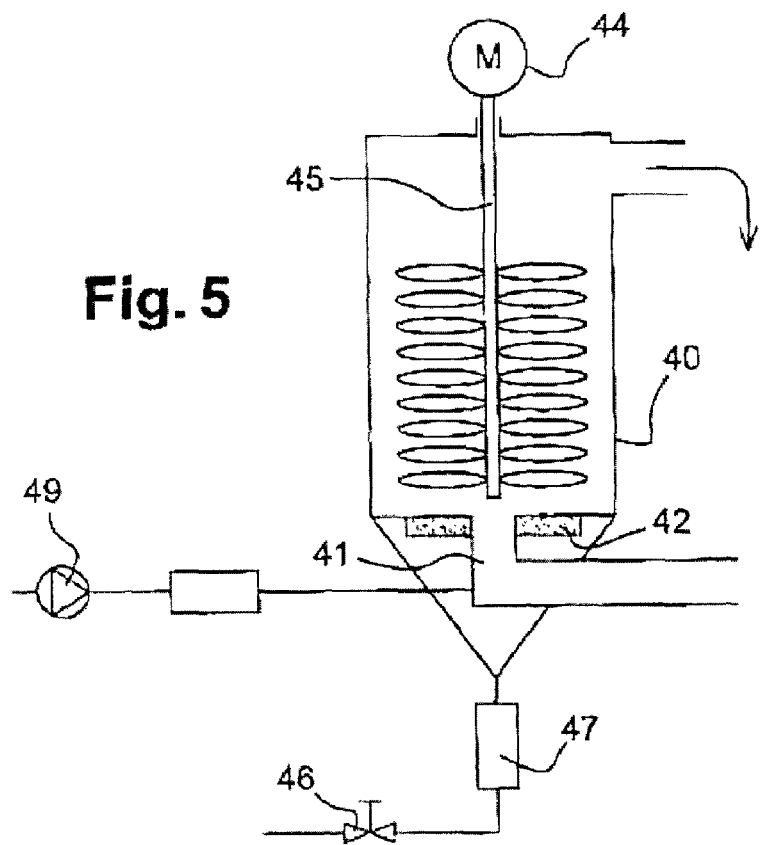
Fig. 5
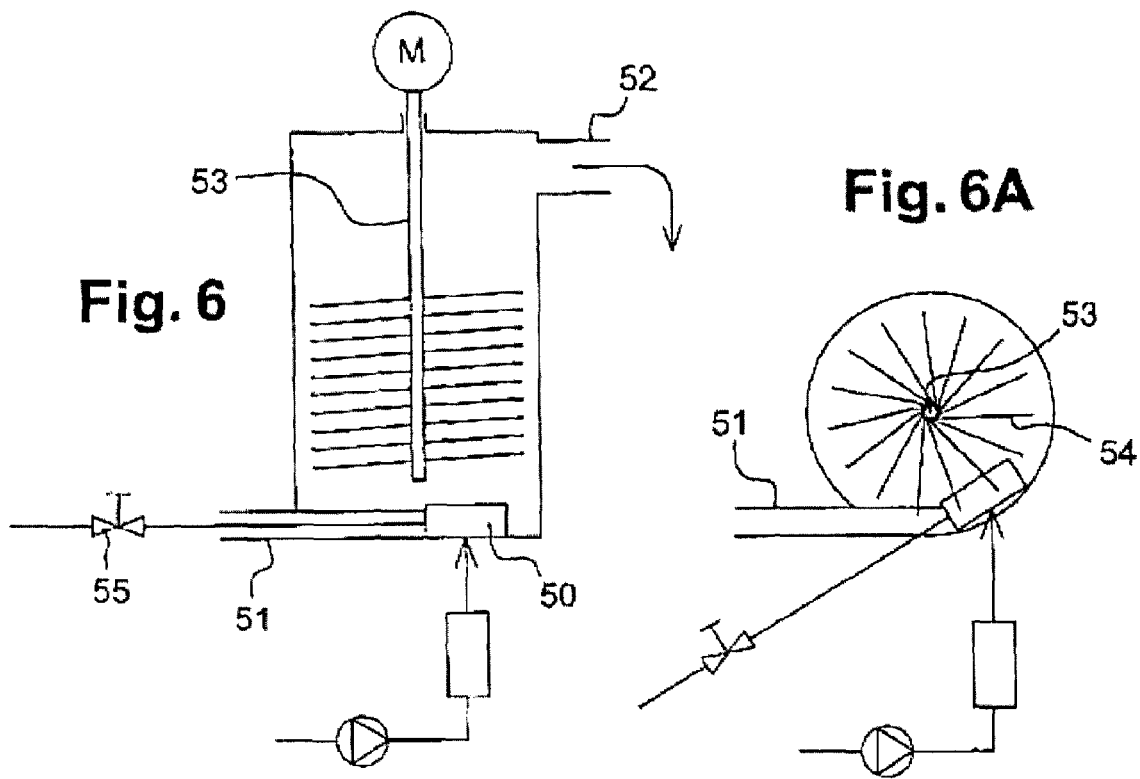
Fig. 6
Fig. 6A

PROCESS AND APPARATUS FOR MANUFACTURING SET CELLULAR CEMENT

CROSS-REFERENCE TO RELATED APPLICATIONS

The present application claims priority of EP 04290494.6, filed on Feb. 24, 2004, the subject matter of which is incorporated herein by reference.

FIELD OF THE INVENTION

The instant invention relates to a process and an apparatus for manufacturing cellular cementitious slurry and the set material obtained therefrom. The invention also relates to processes and apparatuses incorporating the instant process. The instant invention refers in the first place to the manufacture of plasterboard and more specifically to the manufacture of a plasterboard core on continuous plasterboard lines.

DESCRIPTION OF RELATED ART

Cementitious materials are known for many years. Examples of cementitious material can be gypsum (which is available in many forms), Portland cement, sorrel cement, slag cement, fly ash cement, calcium alumina cement, and the like.

Plasterboard consists, grossly speaking, of two sheets of a material having a certain tensile strength, like paper, covering a core, essentially of cement generally gypsum, with a certain compressive strength. The flexural strength of composite material depends upon the combined strengths of the components.

One element influencing the strength of the core is the water/plaster ratio used for the preparation. A rule of thumb is that the compression strength of a cast gypsum body increases with the square of its apparent density. In the range of application the density increases nearly linearly with the inverse of the W/P ratio. Thus, a low W/P ratio is traditionally considered as favorable.

The core of plaster wallboard is usually lightened by incorporation of air into the core preparation. The air in the core appears in the form of bubbles. It has been found that the size and the distribution of the bubbles have influence on the mechanical properties of the core and therefore of the board. A broad size distribution of bubble diameter and evenly scattered over the bulk are favorable. A layer of dense material, without or with fewer voids, near an optional covering is favorable. In that respect, one may revert to U.S. Pat. Nos. 5,085,929 and 5,116,671 to Bruce, hereby incorporated by reference.

The air is usually introduced into the plaster slurry in the form of prefabricated foam. In the normal foam generation systems, a quantity of foam-generating surfactant is diluted with water and then combined with compressed air. Foam is generated using various devices and processes. This foam is injected into the mixer, usually directly in the mixer. The mixer, which is usually a high shear mixer, assures the foam is completely combined with the plaster slurry but at the cost of a huge reduction in foam efficiency. The volume of foam added to the slurry is typically 3 times the volume actually combined in the board. Therefore, in accordance with the classical prior art, part of the gauging water for the plaster is added with the foam. More water in the foam raises the density of the foam and allows more uniform mixing with the plaster slurry, which is of higher density than the foam. However, this additional water reduces the final strength of the gypsum matrix by unnecessarily increasing the space between the gypsum crystals and, thus, forming a weaker structure.

U.S. Pat. No. 5,575,844 to Bradshaw discloses a secondary mixer (mounted in the same casing), in which the foam is introduced, while water and plaster are introduced in the primary mixer. The first mixer is for plaster and water while the second is for foam addition, where the shear is lower.

U.S. Pat. No. 5,714,032 to Ainsley discloses a two-chamber mixer, comprising a first, high-shear, chamber and a second, low-shear, chamber in which the foam is introduced.

U.S. Pat. No. 5,683,635 to Sucech discloses a process in which the foam is inserted into the slurry at a point where it is less agitated than during the creation of the slurry in the first mixer, whereby the foam is less agitated than if inserted in the pin mixer itself.

While these documents provide processes with lower foam consumption, additional water is still combined with the foam to the detriment of the final gypsum core properties.

Further, these documents disclose processes that still provide the usual pore volume with no control over the size and distribution of the bubbles.

Direct air injection during the creation of the cementitious slurry is also known.

U.S. Pat. No. 6,443,258 to Putt discloses a process for making sound absorbing panels in which plaster, fibers, water and foaming agent are mixed and simultaneously aerated using a mixing device similar to a kitchen aide mixer, orbiting and rotating mixing device. Air is entrapped, from the ambient, in the slurry, where the entrapment results from the combination of a dry mixture of plaster, (and optional additives) and of an aqueous mixture of water and surfactant.

DE-A-2,117,000 to Anton discloses a mixer for producing wall-finishing mortar. The apparatus can be worked according to two embodiments. In the first one, air is forced in a flow of gauging water, where said water has been through a cartridge filled with a surfactant. What is introduced in the mortar mixer is actually foam (pressurized foam). In the second embodiment, no surfactant is mentioned. Air is introduced in the slurry through a porous fritted glass member, at a level of the mixing screw of the unique mixer that is used. The type of mixer used in this document is not suited for the production of boards or panels, since the slurry that is produced is of high viscosity so as to adhere to the wall, making this slurry completely unsuited for the conventional production of boards or panels. Last, this type of mixer presents the drawback of a lot of air loss. This design presents the fatal flaw of being a pump of constant volume and with no control of share of air entering the pump. This causes a variation in the water to plaster ratio.

U.S. Pat. No. 6,376,558 to Bahner discloses a conventional mixer in which air is introduced under pressure through a porous fritted glass situated in the walls of the rotating mixer. In this unique mixer, the slurry is generated in a one-step process, since all components of the slurry are introduced at the same time in the mixing chamber. This device can entrain air carried into the mixer by the plaster. Furthermore, the condition for distributing the air into the slurry will vary according to the composition of the slurry, the flow rate through the mixer, and will be more variable as the mixer is worn by the slurry.

U.S. Pat. No. 2,097,088 to Mills discloses a conventional mixer for plasterboard in which air is introduced under pressure through apertures located in the bottom part of the mixer. Said mixer is said to be suited for mixing plaster and fibers. This document did not recognize the issue of the foaming agent and the foam stability, since foaming agents were not used at that time. In this unique mixer, the slurry is generated in a one-step process, since all components of the slurry are introduced at the same time in the mixing chamber. As in the Bahner reference this device can entrain uncontrolled air carried into the mixer by the plaster.

U.S. Pat. No. 5,250,578 to Cornwell discloses a foamed cellular cementitious composition useful for sound-absorbing. The components, inter alia gypsum, water, foaming agent and film-forming agent, an aggregate, optionally fibers, and air can be combined in a slurry preferably by the classical foam introduction into the slurry. The air can also be introduced by mechanical agitation.

U.S. Pat. No. 1,687,067 to Hinton discloses a continuous process for making cellular cementitious material, in which a high-viscosity pulp (containing a so-called frothing flotation reagent or flotation oil) is agitated in a reactor, where air is bubbled from the bottom of the reactor and the foamed cementitious pulp is added well above the disk overflows from said reactor at a nearly equivalent level. The bubbles thus-formed are said to be "fine bubbles", due to the use of a rapidly rotating perforated disc or other means placed immediately above the air distributing plate. The air, in this method, that is entrapped would be poorly mixed into the slurry, especially for quick-setting cement. The mixer as described is not suitable for rapid setting cements because it permits long residence times due to the proportion of length to diameter and the vertical orientation. There is no mention of the products that could be manufactured using said process.

U.S. Pat. No. 1,660,402 to Thompson discloses a process for producing cellular cementitious material. In a first step a slurry (e.g. gypsum and water) is first produced, in a vortex mixer which does not allow the addition of foaming agent into the gauging water. This slurry is then introduced into an air-mixing chamber, where air bubbles are created. The air is agitated into the slurry without control over the quantity or form of the voids in the slurry. Colloidized water (e.g. with saponin which is the sole agent referred to in the text that could function as a foaming agent) is then introduced, where this liquid will act as a foaming agent. Hence, this process relies on the addition of the foamer after the air bubbles have been created in the slurry, where the foamer introduced further adds water to the initial amount of water, and without control of the form of the bubbles in the hardened mass. The diluted foaming agent is introduced into the second mixer, where this additional water has the same effect as the water added in the prefabricated foam of later designs.

U.S. Pat. No. 5,013,157 to Mills discloses process and an apparatus for manufacturing aerated cementitious slurry. Dry cementitious components are mixed in a screw mixer; the blend is discharged into a hopper, where said hopper is also connected to a water feeding device at its bottom part while being free at its upper part. The wet slurry then enters a further screw pump, the rotation of which creating air suction and consequently air entrainment into the wet slurry (since the rated capacity of the pump is greater than the rate at which the wet slurry are fed to the mixing inlet). Aerated slurry is thus formed.

U.S. Pat. No. 5,660,465 to Mason discloses a process and apparatus similar to the one disclosed in U.S. Pat. No. 5,013, 157 above. In Mason, the water is fed at the same time to the first screw pump, so that a slurry exits said first pump. The slurry is then similarly fed from a chute into a hopper, where said hopper is connected to a positive displacement progressive cavity slurry pump. By adjusting the rotation speed, the ratio of slurry to entrained air can be modified.

In the above documents to Mills and Mason, whenever a pump is used for entraining air, this does not result in favorable results since those pumps mentioned are not mixers and do not blend correctly. At best the pumps can be qualified as kneading machines, which cannot create foams.

None of the above documents discloses air injection matured into a reliable, industrial process used for the manufacture of plasterboard or panel.

There is thus still a need to provide further mixing apparatus and process that would permit control of the bubble structure with the goal of producing high quality foamed or cellular slurry.

None of the above documents teaches or discloses the instant invention.

SUMMARY

The invention thus provides a continuous process for manufacturing set cellular cement, comprising the steps of: (i) mixing cementitious material, water, foaming agent and optionally additives into a free flowing slurry having a slump of at least 100 mm; subsequently (ii) injecting and distributing air into the slurry of step (i) to form a cellular slurry; subsequently (iii) casting said cellular slurry of step (ii); and finally (iv) allowing said cellular slurry to set.

A mixing device for manufacturing a cellular cement slurry, comprising: (i) at least one first mixing device comprises a cement inlet and a water and foaming agent inlet, said first mixer being a high-shear mixer operated under conditions to prepare a fluid slurry; and (ii) at least one-second mixing device comprising air injection means, said second mixer being operated under controlled-shear conditions.

A mixing device for manufacturing a cellular cement slurry, comprising: (i) at least one first mixing device comprising a cement inlet and a water inlet, said first mixer being a high-shear mixer operated under conditions to prepare a fluid slurry; (ii) at least one further first mixing device comprising a fluid slurry inlet and a foaming agent inlet; and (iii) at least one second mixing device comprising air injection means, said second mixer being operated under controlled-shear conditions.

An apparatus for manufacturing a set foamed cement body comprises (a) at least one mixer according to the invention, (b) means for casting a cellular slurry and (c) means for moving a facer.

A preferred embodiment is based on the use of two mixing steps that are carried out separately: the first one mixes the cementitious material, water and foamer. The second mixing or blending step is carried out to incorporate air. These mixing steps are preferably carried out at different conditions, the first being under high-shear in order to create a homogeneous slurry while the second is under controlled shear and flow path in order to create a desired foam structure. Controlled shear conditions are those conditions which the skilled man may select depending on the slurry, the rate of injection of air, and the final desired cellular or void structure. For example, depending on the slump of the slurry, the controlled-shear conditions will be either towards low-shear or towards higher-shear (but still substantially lower than the high-shear conditions of the first mixer) if one is seeking rather large or rather fine bubbles. The type of second mixer of blender will also have influence, as well as the type of foamer, additives, etc. The skilled man will know by routine tests how to determine and apply the controlled-shear conditions in order to obtain the desired void structure.

The basic idea of the preferred embodiment is to use the slurry as the liquid used to create a foamed slurry. The foaming then happens essentially without the addition of water which necessarily comes with prefabricated foam since only air is added in a second step. This does not exclude the optional addition of liquid additives, which would preferably not exceed two percent by weight of the total slurry. This also does not exclude using prefabricated foam in the first step. This does also not exclude staged addition of the components, where gypsum, water and optionally additives would be added in the first mixer, while the foaming agent would be added at about the exit of the first mixer, prior to the feeding to the second mixer providing air blending.

By applying the preferred embodiment, the dimension and distribution of the foam bubbles can be controlled by the blending conditions and flow path. The result is a foamed body, which can be optimized to form either a stronger or lighter body or to use less foaming agent and less water than the existing process to produce normal weight boards.

The process of the embodiment allows an optimization of high quality cementitious slurry in the first stage, and foamed slurry with controlled (even bimodal) bubble size and distribution. A bi-modal distribution might be created by separating the discharge from the plaster mixer into two different air blenders. The different streams could be gently recombined into a true bimodal distribution.

High shear mixers should preferably have relatively small internal space with a low residence time, and the high shear avoids clogging in the mixer. The controlled shear mixer with plaster should also preferably fulfill certain criteria in order to prevent clogging or scaling in the mixer. One preferred feature is the design of an internal cavity which will avoid recirculation of the slurry before discharge. Other features known in the art can also be applied (keeping inlet open with the material moving to the discharge; special liners and/or flexible walls; heating parts where phase bounders occur, etc.). Preferably, the second blender will generate a rather sharp residence time distribution.

Another element of the present embodiment is the control of the air incorporated in the slurry by assuring the "net" air void incorporated in the slurry, since all air introduced into the slurry in the second mixer will be incorporated in the final cementitious product.

The process of the invention also provides plasterboards and panels with enhanced properties.

BRIEF DESCRIPTION OF THE DRAWINGS

The invention is disclosed with reference to the following drawings.

FIG. 5 represents a second embodiment of a controlled shear mixer of the invention;

FIGS. 6 and 6a represent a third embodiment of a controlled shear mixer of the invention;

DETAILED DESCRIPTION OF EMBODIMENTS OF THE INVENTION

The invention is disclosed in more details below, where the embodiments are not given in a way to limit the practice of this invention.

Figure 1:
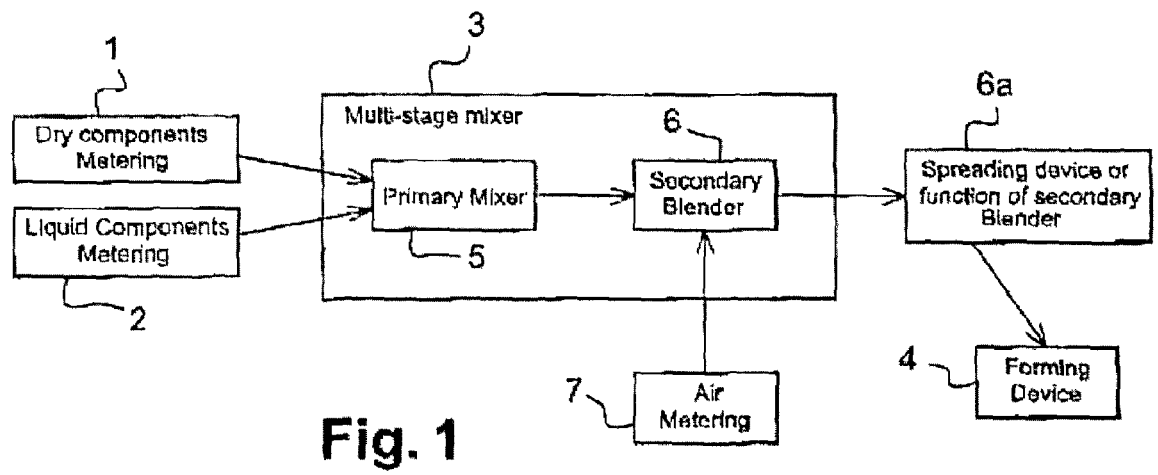
FIG. 1 is a schematic representation of the invention.

With reference to FIG. 1, the process of the disclosed embodiment comprises dry component(s) metering means 1 and liquid component(s) metering means 2, a multi-stage mixer 3, and a forming device 4, said forming device being a classical one. The multi-stage mixer 3 comprises a primary mixer 5, being preferably a high shear mixer, and a secondary mixer 6, being preferably a controlled shear mixer.

The foaming agent is metered in the first mixer together with the other various components (dry and liquid). Air metering means 7 are provided in the secondary mixer 6. This air metering means 7 will deliver the required amount of air needed to produce the cellular slurry. The cellular slurry is then delivered to a classical forming device 4, optionally by a spreading device 6a.

Figure 2:
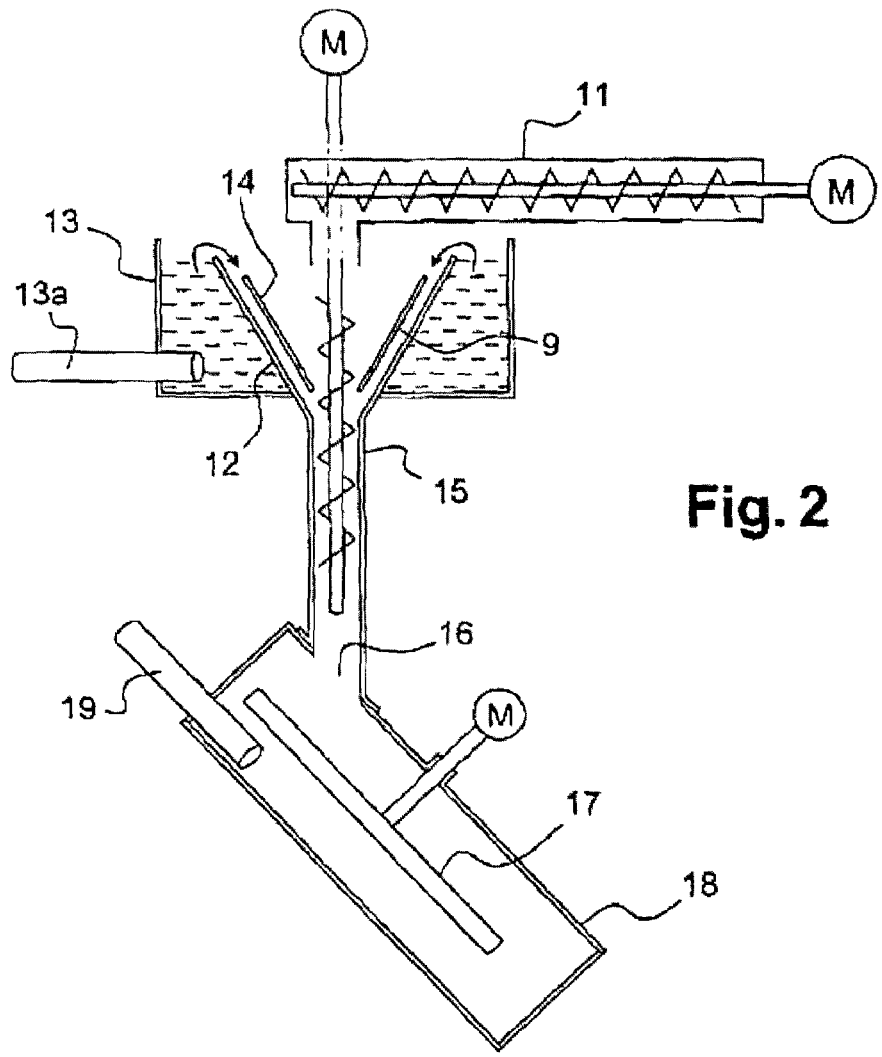
FIG. 2 represents a first embodiment of a high-shear mixer of the invention.

FIG. 2 is a schematic representation of one embodiment of the first, primary mixer used in the invention. A similar mixer is disclosed in DE-A-3,138,808, incorporated herein by reference. The mixer 5 comprises dry and liquid metering means 8, feeding into one device. Said device uses an overflow of liquid into a funnel 12. Dry materials (cementitious material and dry additives if any) are metered and combined into a feeding device which discharges into the funnel 12. Liquid additives are metered into the liquid phase via the pipe 13a. The pipe goes tangentially into the vessel 13 letting rotate the liquid which, then, flows evenly over the rim of the funnel 12. A scraper 9 is placed in funnel 12. The scraper 9 and the open screw 10 are driven by a motor assuring that no dry material sticks on the walls. Pipe 15 will then feed a rotating high-shear mixer 5a. Any type of known high-shear mixer can be used. Examples are pin mixer, Gorator®, rotor/stator mixer and disc mixer.

One preferred mixer is an inclined disc mixer. The inclined arrangement with the discharge 19 at the highest point avoids the capture of ambient air into the slurry. The pipe 15 is connected to the mixer through inlet 16. A motor-driven disc 17 rotates at high speed in housing 18. The disk sits eccentrically in the case, touching the wall at the discharge location in order to avoid the feed taking a "short cut" to the discharge without passing through the mixer or eventually residing in the mixer. The cementitious slurry then leaves mixer 5a through the discharge outlet 19. Control can be achieved by acting on liquid flow rate in pipe 13a and/or on the flow rate of the cementitious material by screws 10 and 11. Typical dimension for a 20 m$^3$/h flow rate is a diameter of the disc of about 80 cm.

Figure 3:
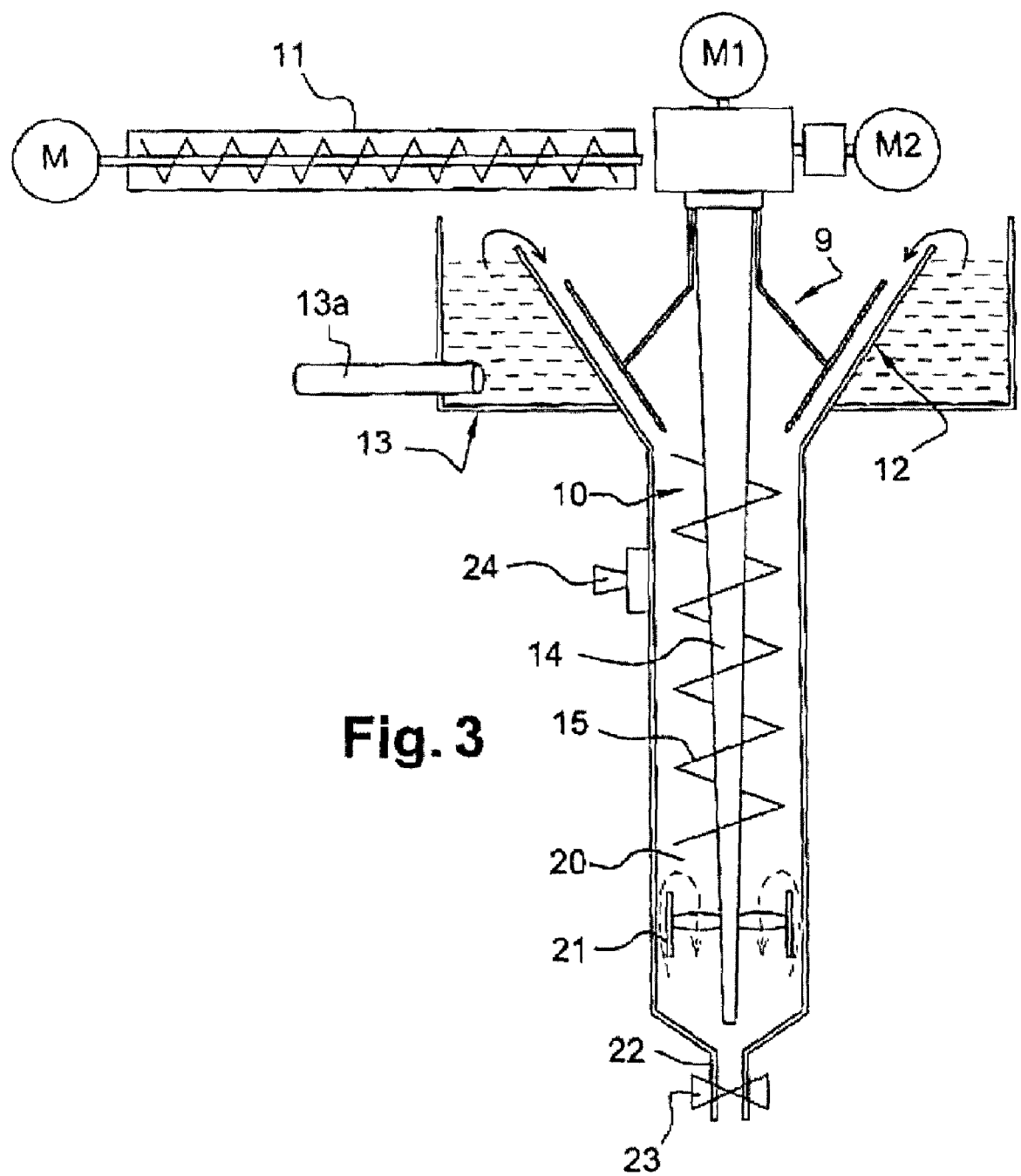
FIG. 3 represents a second embodiment of a high-shear mixer of the invention.

FIG. 3 is a schematic representation of a variant of the embodiment of FIG. 2. In FIG. 3, one will recognize the funnel 12, recipient 13, and associated pipe 13a, feeding screw 11, screw 10, and pipe 15. In this embodiment, the scraper-screw device 9 is mounted to rotate in funnel 12. Its driving force is delivered to 9 by a motor (M1). A further axis 20 will rotate inside the scraper 9 and screw 10, where an extra motor, M2, will drive said axis 20. Said axis 20 will extend further downstream with respect to screw 10. Axis 20 is equipped at its bottom with a turbine 21. Said turbine can be any turbine known in the art, such as an impeller turbine, an indented high-speed disc, etc. Said turbine 21 rotates at high speed, thereby creating high-shear in the medium. The cementitious slurry will then be discharged through pipe 22, which may optionally be equipped with a flow control valve 23. A sensor 24 for detecting the mixture level in the space 14 or at any other location along pipe 15 may also be provided (said sensor might also be provided in the embodiment of FIG. 2). Such a sensor allows for a better control, in which sensor 24 may command control valve 23 and/or liquid flow rate in pipe 13a and/or flow rate of cementitious material by screws 10 and 11. Typical dimensions are a diameter of about 20 cm and a length of the mixing zone of once to twice the diameter.

The cementitious slurry leaving the high-shear mixers, such as those embodied in FIGS. 2 and 3, but not limited to them, is then sent to a controlled-shear mixer in which the cementitious slurry is blended with air so as to create cellular cementitious slurry. Many controlled-shear mixers can be used to that end.

One blender can comprise a porous fritted plate made from glass, metal, synthetics or ceramics. Such porous fritted plate can have pore sizes in the order of ten microns, for a thickness of about a few millimeters. The air injection devices as disclosed in DE-A-2,117,000 and U.S. Pat. No. 6,376,558 are appropriate. Notably, a stirrer in a housing where part of the wall comprises a porous fritted glass is suitable. Many stirrers (screw, wire stirrer, etc.) are appropriate. Alternatively, air can be injected using a dip-leg or any other suitable air-injection device. Air can also be introduced by a multitude of holes, or though screens, or preferably through nozzles injecting the air.

Figure 4:
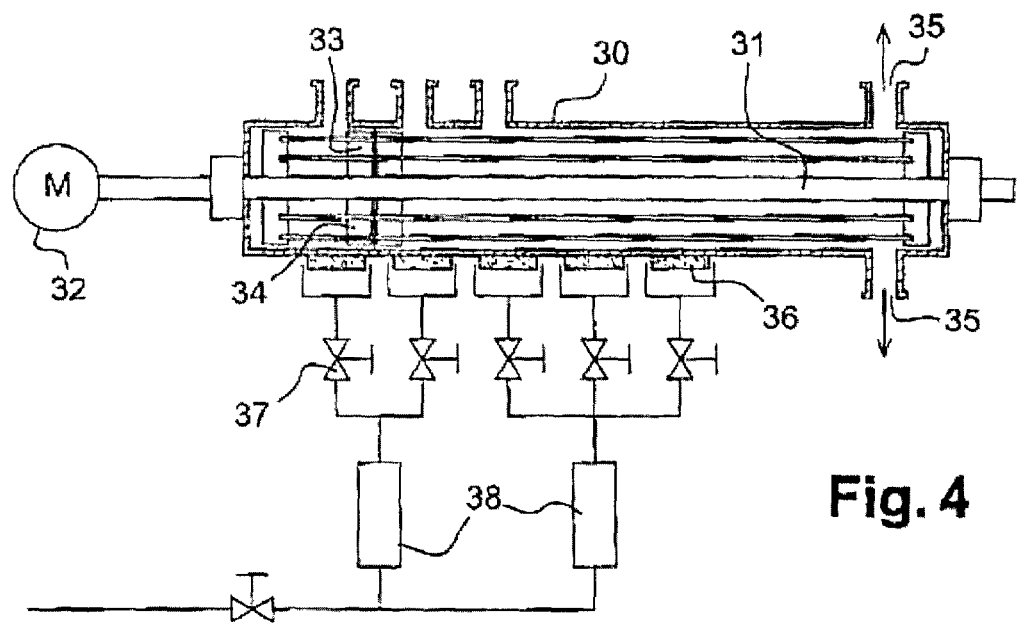
FIGS. 4, 4a and 4b represent an embodiment of a controlled shear mixer of the invention.
Figure 4A:
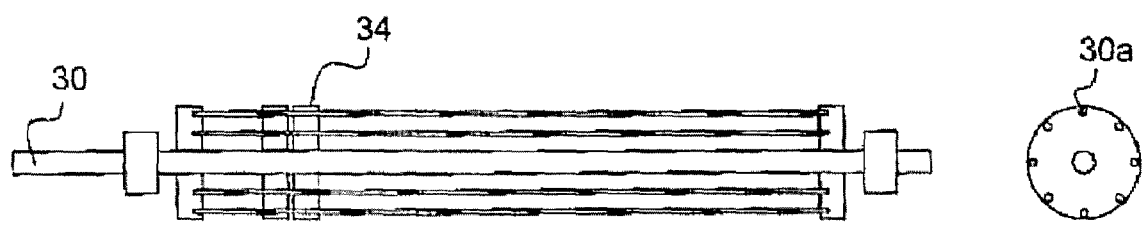
Figure 4B:
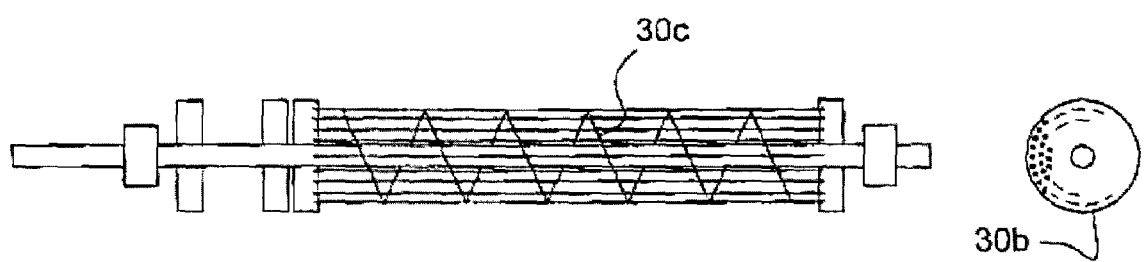

FIG. 4 discloses a first example of a secondary blender. It consists principally of a horizontal tube 30 with a rotating stirrer shaft 31 along its long axis. The stirrer is driven by a variable drive 32. The orientation of the feed of the primary slurry is not an essential element. However a preferred embodiment is tangentially from the top of the horizontal tube. Different emplacements of the feeder orifice 33 are possible in order to adapt the average residence time of the slurry in the second mixer. For the same purpose a separation disk 34 can modify the active volume of the tube according to slurry requirements. The stirrer can be of the "squirrel cage type" 30a, as shown in FIG. 4a. As shown in FIG. 4b, the stirrer can comprise other means for agitation, for example tended wires 30b and/or screw-like springs 30c. The aerated slurry leaves the blender through an outlet 35 opposite to the receiving end. The orientation of the outlet 35 is preferably upper side in order to keep the blender full. Air can be injected by means of fritted bodies 36 arranged along the bottom side of the tube. The air is under pressure and metered by valves 37 and flow meters 38. A variant, not shown here, is with the case being conical shaped with the larger diameter at the discharge end. In this case the bottom side of the case might be horizontal so that the agitator axis points upward toward the discharge.

FIG. 5 discloses a different type of secondary blender. It consists mostly of a vertical cylindrical mixing vessel 40, a bottom with slurry feed which can be central, as shown in 41, or lateral and fritted elements 42 for the air injection. A stirrer with (optionally) variable drive 44 and agitating elements 45 creates the foamed product. A valve 46 and a flow meter 47 control the airflow. The discharge is on the upper part, the slurry exiting as an overflow. An inlet 49 for metered liquid additives is optional.

The secondary blender displayed in FIG. 6 is a vertical blender as well. Air is introduced by means of one or several nozzles 50 which may be mounted to inject air tangentially around the circumference of the mixer. The feed of the primary slurry 51 is tangential with respect to the lower end of the mixing vessel. The feed of slurry and air converge in a venturi nozzle creating a pre-blend. The outlet 52 is on the upper part, as in the previous figure. The stirrer 53 is equipped with a multitude of, preferably, elastic wires 54 made out of metal or plastic. An inlet 55 for metered liquid additives is optional. FIG. 6a is a top view of this embodiment.

In a variant of the blenders of FIGS. 5 and 6, not shown here, the blender vessel is closed on the top end, but leaving a certain space over the outlet. At the upper side of the cover is a level sensor capturing the level of the slurry and a pipe, equipped with a manometer, a pressure control valve and a flow meter. The pressure control valve is guided by the level sensor in such a way that the level of the slurry remains constant with regard to the discharge. The manometer allows to monitor whether a resistance is built up in the discharge/distributing system. The flow meter in collaboration with the flow meter 47 allows monitoring the fraction of air entrapped. It would also allow the overflow discharge to work against a resistance, for example, a distributing device.

Figure 7:
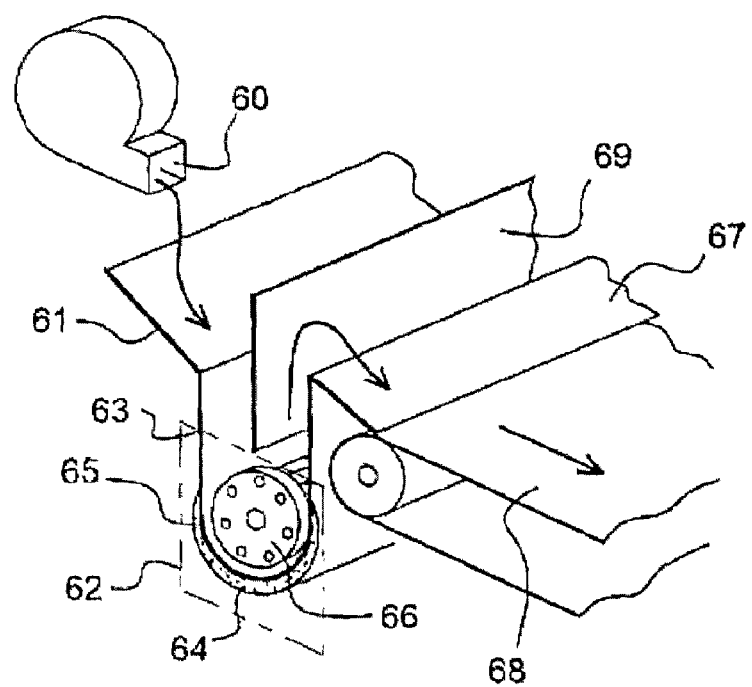
FIG. 7 represents a fourth embodiment of a controlled shear mixer of the invention.

FIG. 7 discloses an embodiment of the invention, which combines the step of injecting air and spreading the foamed slurry on a facing material. The cementitious slurry is discharged from the high-shear mixer through a discharge pipe 60 (which may be connected to the devices embodied in FIGS. 2 and 3 or any other suitable primary mixer). As known in the art, non-foamed cementitious slurry will spread without alteration in contrast with foamed slurry which can segregate when large bubbles are present or can coalesce over the length of the displacement. Hence, in the instant embodiment, cementitious slurry spreads over a plate 61. The cementitious slurry will then flow from plate 61 into a horizontal blender 62 in some respect similar in its concept to the one designed in FIG. 4 but working in cross-flow rather than along its axis. This blender 62 which acts as a stirring and air injection device, which comprises a rectangular container with vertical rear 63 and front 67 walls and a half-round bottom. The lower part of the rounded part, referenced 64 comprises porous fritted elements 65 that may extend over about 10 to 50% of the circumference. Air is injected through said fritted elements into the cementitious slurry to form cellular slurry. A rotating stirrer 66, fitting in the rounded part, will ensure the blending of air with the slurry. The stirrer is preferably, but not limited, of the type drawn in FIG. 4a or 4b. Said aerated slurry being discharged across the width of the device, it does not need to be spread again over the width of the facing material. Thus, in contrast with the existing art in which foamed slurry are poured at discrete locations, a bubble size gradient can then be avoided by a continuous and consistent flow of aerated slurry onto the facer. The aerated slurry will exit the blender flowing over the wall 67 and will then be in contact with the facing material 68. Preferably a separation wall 69 is placed substantially in the central portion of the mixer and close to the stirrer, in order to clean up the stirrer if needed and to ensure that only aerated material is deposited on the facing material. The blender rotates in counter-clockwise working like a pump to move the aerated slurry to the facer. Typical dimensions for a 20 m3/h flow rate of primary slurry are diameter of the rounded part about 250 mm and a width of about 1200 mm.

Figure 8:
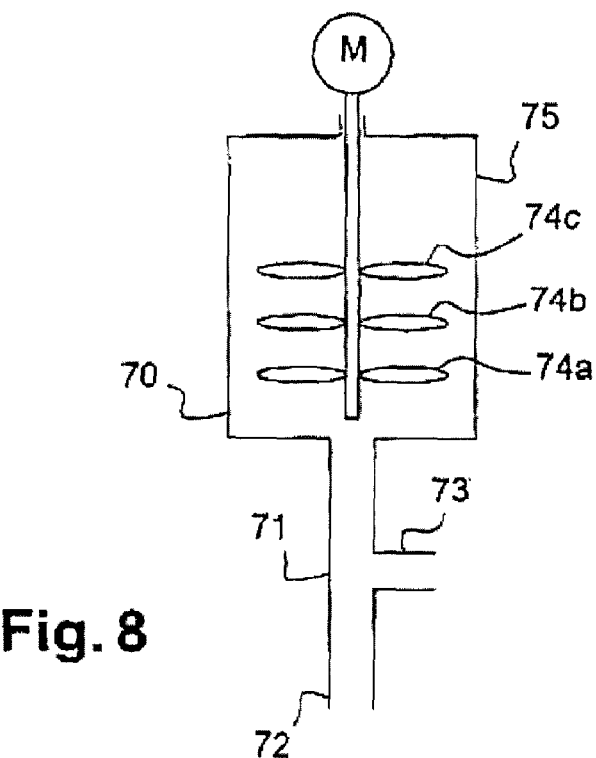
FIG. 8 represents a fourth embodiment of a controlled shear mixer of the invention.

FIG. 8 discloses a further variant of the second mixer used in the invention, used in lab scale development. It comprises a barrel 70, with a tee 71 at its bottom for receiving the slurry (which may be manufactured according to any high-shear process) through pipe 72 and air through pipe 73. Air and the slurry mixes to some extent in the tee, and then the mixture penetrates into barrel 70. Barrel 70 is equipped with a rotating shaft with agitator blades 74a, 74b, etc., e.g. 8 blades par stage, where the shaft would comprise e.g. 4 stages, with the lower stage being close to the inlet into barrel 70. Barrel 70 will show an inclined top discharge 75. For example, the barrel might be of about 90 mm inner diameter, with blades of about 40 mm radius and 1 mm thick. The barrel will be about 210 mm high up to the lowest part of the discharge inclined part 75, and the blades will be along the shaft separated by about 60 mm each. The inlet of the tee inside the barrel has a diameter of about 15 mm.

Use of a nozzle for injecting air is beneficial for some embodiments of the invention. Expansion of air in the slurry after injection, especially by the nozzle, is some aspects beneficial for air distribution. Also, the nozzle makes the design simpler and would be less prone to packing off with set gypsum and more tolerant of the fibers, if and when used.

The high-shear mixer used in the invention is typically one in which the peripheral speed is generally at least 400 m/min, preferably from 500 to 700 m/min and an average residence time of 1 to 10 seconds in order to create homogeneous and lump-free slurry.

The secondary blender is generally characterized by the capability to distribute the air appropriately through the slurry (this blender or mixer cannot generally be characterized by shear or speed alone). The operative conditions depend upon the basic design of the mixer, the means of introducing air, the viscosity of the slurry, the average residence time and the desired air bubble size distribution. The skilled man would know how to adapt dimensions and rotation speeds by routine tests, so that the final operative conditions will ensure a good blending of bubbles into the slurry. If the air is already introduced in finely divided bubbles a gentle blending to homogenize the blend is generally sufficient. In the case where the air is introduced in larger bubbles or as a continuous stream the mixer should be able to grind down the bubble size, if it is so required. In a horizontal tube mixer of the type shown in FIG. 4 or a vertical mixer as shown in FIGS. 5 and 6, having a whisk type agitator, the operation mode can by described by the speed of the wires and the product of number of wires times average residence time. The values are then determined after routine testing.

The invention also provides a process for manufacturing wallboards having layers and/or edges of densities higher than the core. It is known to produce hard edges by applying specific flows of gypsum slurry at the time the slurry is cast onto the moving band. In embodiments of the invention, part of the slurry produced by the high-shear mixer, which is not foamed or foamed to a rather low extent, is diverted and used as the flow for the hard edges. Similarly, part of the slurry produced by the high-shear mixer can be used for producing the dense layers which are present between the foamed core and the facer. In that respect, one may revert to U.S. Pat. Nos. 5,085,929 and 5,116,671 to Bruce, hereby incorporated by reference. It is also within the ambit of the invention to use a small amount of prefabricated foam in the first mixer, for example to have edges of given density (for example if non-foamed slurry would result in a too hard edge). The amount of prefabricated foam introduced will depend on the final properties desired.

The broad bubble distribution can also be achieved by more than one air blender with each one forms a part of the distribution. Those distributions are then recombined to form the desired distribution.

The resulting cellular cementitious slurry comprises bubbles of various sizes. Present embodiments of the present invention allows for a compromise to reconcile the size of the bubbles and their tendency to segregate in dense slurry. It may be possible to obtain a bimodal distribution of bubble size in the secondary blender. It is contemplated, albeit not preferred, to inject a small volume of foam in the first high-shear mixer in order to create slurry lightened by very small bubbles. In such a case, the direct air injection in the second mixer would be configured to create larger bubbles and hence a bi-modal distribution of the desired balance.

The cementitious material can be any material that will set with water. Preferably the cementitious material is plaster, i.e. hydratable calcium sulfate (anhydrite or α- or β-hemi-hydrate). It may also be any known hydraulic binder. Cementitious material is generally a fine-grained powder with a median particle size in the range of 5 to 100 μm. Specific embodiments of the invention are particularly designed for quick-setting cement, having a set time less than 30 min, preferably less than 20 min, more preferably less than 10 min.

The material may also comprise aggregates and/or fillers. Aggregates are inert particles with a median size essentially higher than the cement. Fillers are inert powders with a median size essentially lower than the cement. Examples of fillers are fumed silica, fly ash, blast furnace slag, micro-silica and fine limestone. Examples of likely aggregates are lightweight vermiculite, perlite, micro-spheres, and expanded shale, while heavy aggregates would be silica or limestone sand.

The foaming agent that may be used can be, but is not limited to, any one that is used in the art of plasterboard e.g. an alkyl-ether-sulfate and/or alkyl-sulfate. Examples can be found in the following publications, which are incorporated by reference. U.S. Pat. No. 4,676,835, U.S. Pat. No. 5,158,612, U.S. Pat. No. 5,240,639, U.S. Pat. No. 5,085,929, U.S. Pat. No. 5,643,510, WO-A-9516515, WO-A-9723337, WO-A-0270427 and WO-A-0224595. The amount of foamer used is classical and can be from 0.01 to 1 g/l of slurry (expressed on active material over solid content of the slurry.).

In one embodiment, the slurry and the resulting set cementitious material will comprise fibers. The amount of fibers is typically from 0.05 to 5% by volume, based on the volume of the primary slurry. They are typically 3 to 20 mm long and have typically a diameter of 10 to 20 μm. Glass fibers or high modulus synthetic fibers are suitable. In other embodiments, the invention is practiced in the absence of fibers. In the absence of fiber means that the amount is less than 0.01% by weight, preferably less than 0.001% (only unintended impurities) and typically no fiber will be present at all. A fiber is any fiber typically used in the art. One can refer to U.S. Pat. No. 6,443,258, which is incorporated by reference herein. "In the absence of fibers" does not exclude the presence of cellulosic material, especially originating from reclaim material, as is typically used in the instant field.

The resulting set cementitious material can have a void volume that can vary within broad limits. The void space of a hardened cementitious material consists of two classes: the voids left by evaporated water and the bubbles created by air. Generally, the volume of the water voids depends only on the water/plaster ratio, whereas the aerating process can control the air bubble volume. For a plaster, the water voids vary from about 40 to about 65% vol or W/P ratio of 0.45 to 1.05 respectively. The air bubble volume for a given W/P ratio, say 0.65, ranges from about 25% vol to about 83% vol for densities from 900 to 200 kg/m$^3$ respectively. Thus, e.g., for a given density of 400 kg/m$^3$ and a W/P ratio of 0.65 it was found a water void of about 17.5% vol and a bubble volume of about 65.5% vol, resulting in a total pore volume of about 83% vol. Hence, the total % vol in the set composition may vary between broad limits; it may range from 47 to 95% vol in one embodiment while in another embodiment it ranges from 53 to 75% vol.

Facer materials are those that are used in the art in a conventional manner. In one embodiment, the facer is paper. In another embodiment, the facer material is a non-woven mat, preferably a glass mat or a mat formed of other fibers (e.g. synthetic fibers or a mixture of cellulosic fibers and synthetic fibers). The use of composite facers with two of more layers of different compositions and orientations fibers is also encompassed. The cementitious slurry may penetrate partly in the facer, fully, or the facer may even be embedded in the cementitious core.

The resulting board can be a dense board or a lightweight board, with core densities from 200 to 1100 kg/m$^3$.

It should be understood that any additive classically used in the art could also be used in the instant process. The additives are those influencing the behavior of the slurry like retarders/accelerators but not limited to them and additives influencing the behavior of the final product like water repellents and biocides but not limited to them. The range of additives is very wide as will appreciate the skilled man.

Resins for the improvement of the mechanical and/or aesthetic properties, known in the art can be added. Examples of resins beneficial alone or in combinations are: polyacrylic, polystyrene, polyvinyl chloride, polyolefin, polyurethane, cellulosic, polyalcohol, polyamide, polyester, polyether, polyphenolic, polysulphide, polysulphone, silicone, fluoropolymer. These types of resins can by combined in co-polymers or other combinations, e.g. as styrene-butadiene copolymers.

Examples of couples retarder/accelerator are conventional plaster retarder/BMA, sodium polyacrylate/aluminum sulfate and sodium phosphonate/zinc sulfate.

A bubble stabilizing agent can also be used.

A water-soluble viscosity modifier can also be used. Examples are polymers (cellulosic, polyalcohol, polyurethane, polyester, polyether, polyacrylic, co- and terpolymers thereof), clay (modified/natural), fumed silica, hydrophobically-modified or surface-modified additives.

In the conventional plasterboard production the slurry coming out of the mixer has the tendency to be stiff compared with discrete laboratory samples of the same water/plaster ratio. This phenomenon has to do with the forced setting acceleration and the fact that a conventional continuous plasterboard mixer may retain parts of the slurry much longer then the average residence time. Thus, in the art it is well known to combine retarders and accelerators or in order to postpone the first stiffening as close as possible to the forming moment.

The two step mixing process of embodiments of the invention allows one to enhance the desired effect by separating time and location of the addition of the two additives, where the retarder would be added in the first step and the accelerator in the second step.

Furthermore, it has been found that the addition into the first mixer of a product blocking more or less completely the rehydration combined with the addition into the second mixer of a product which neutralizes the blocking agent, is favorable for the process. Such a couple of additives is sodium polyacrylate (e.g. of a molecular weight of about 2000) as blocking agent and an aluminum salt as e.g. aluminum sulfate as the neutralizer. For the purposes of the present disclosure the blocking/unblocking (neutralizer) agent will be considered as retarder/accelerator. The accelerator is typically added just at the inlet of the second mixer.

One embodiment comprises the steps of first preparing a slurry of plaster and water (optionally with additives) but without foaming agent. The foamer is then added after the slurry is prepared; typically the foamer would be injected just at the inlet of the second mixer (i.e. at the same time the accelerator is added to the second mixer). Not adding the foamer initially may also further reduce air entrainment in the first mixer, if any.

In another preferred embodiment, the foamer is added together with the accelerator. This provides additional benefits, since the accelerator efficiency appears improved. Also, the pour time of slurries with foamer in the gauging water is lower than with foamer added together with the accelerator.

The embodiment with foamer added after the first mixer is especially useful for applications to standard wallboards lines, where the high-shear mixer (typically a pin mixer) will serve as the first mixer of the invention, without any substantial risk of air entrainment. The matrix obtained in this embodiment is supposed to be stronger.

Exemplary amounts of additives are 0.1 to 5 weight percent.

For the measure of slump, one will use the Schmidt ring. The NF B 12-401 or ISO DIN 3050 standard (Schmidt ring: internal diameter 60 mm, height 50 mm) is applied. After sprinkling the plaster into water for 15 sec and letting it soak for 30 s, the mixture is stirred for 30 s before filling the Schmidt ring. The ring is removed at 1 min 15 s and the diameter of the spread slurry is measured.

EXAMPLES

Samples for comparison in flexural strength were prepared in the following composition:

| Component | Weight (php, for 100 parts of plaster) |
|---|---|
| Plaster | 100 |
| Ball mill accelerator | 0.44 |
| Starch | 0.48 |
| Potash (dry) | 0.1 |
| Retarder liquid 35% active | 0.014 |
| Plasticizer liquid 40% active | 0.27 |
| Foaming agent liquid 40% active | 0.16 |
| Water | 70 |

The method used for manufacturing conventional formulations in the laboratory is as follows. Weigh the dry components together except the potash and dry blend. Foaming agent is blended in 30% of the gauging water and foamed for 60 seconds in a Waring® blender. Weigh 70% of the water the plasticizer, retarder and potash, blended together and kept apart from the foam. Dry components are placed in a Hobart® rotating orbital mixer in a bowel with a wire whisk mixing attachment. Water and additives are poured on the dry materials and agitated for 5 seconds on speed 2. The mixer is stopped and the speed changed to speed 3. Prefabricated foam is added to the mixing bowel and mixed on speed 3 for 5 seconds. The mixer is stopped and the slurry is poured into an envelope of wallboard cardboard. The cardboard is supported by vertical walls spaced at the designed thickness of 12.5 mm. The sample is removed from support and trimmed to size at final set. Then it is dried at a high initial temperature and low final temperature in a high air flow conditions until dry. The sample is conditioned at 40° C. for 24 hours. Then it is weighed and broken in three point flexure test.

The direct air injection method of embodiments of the invention is the following. Weigh the dry components together except the potash, if any, and dry blend. Weigh the water, the plasticizer, retarder foaming agent and potash, if any, and blend together. Add the dry into the wet. Mix the components with a high-shear mixer being a kitchen mixer simulating the mixer in FIG. 3 for 30 s to a fluid consistency of 220 mm in a few seconds. Pump the slurry in to the air blender of FIG. 5 at a rate of 100 l/h and inject air through a fritted bottom, at a rate of 1000 l/h and catch the discharge. The forming, drying and testing procedure is then the same as above.

The resulting samples had the following properties:

| Property | Comparison | Invention |
|---|---|---|
| Thickness (mm) | 12.46 | 12.47 |
| Density (g/cm3) | 0.617 | 0.627 |
| Plastic yield (MPa) | 0.98 | 1.16 |
| Young's Modulus (MPa) | 1 374 | 1 711 |

What is claimed is:

1. A continuous process for manufacturing set cellular cement, comprising the steps of:
   (i) mixing a cementitious material, water, a foaming agent, a retarder, an accelerator and optionally additives in a primary mixer under high-shear mixing conditions, an amount of the foaming agent being 0.01 to 1 g/l of slurry, an average residence time being 1 to 10 seconds, and the peripheral speed being at least 400 m/min, into a free flowing slurry having a slump of at least 100 mm, wherein the primary mixer is an inclined disc mixer; subsequently
   (ii) injecting air by a nozzle in a secondary mixer under controlled-shear mixing conditions, the peripheral speed being lower than the high-shear mixing conditions of step (i), into the slurry of step (i) and distributing air through the slurry to form a cellular slurry, wherein the secondary mixer comprises a tee for receiving the slurry through a first pipe and air through a second pipe; subsequently
   (iii) casting said cellular slurry of step (ii); and
   (iv) finally allowing said cellular slurry to set,
   in which the cementitious material is calcium sulfate α-hemi-hydrate, calcium sulfate β-hemi-hydrate or a blend thereof, and the final set product has a core density between 200 and 1100 kg/m$^3$,
   wherein a water/plaster ratio of the slurry is 0.65 to 1.05 by weight, the plaster being the cementitious material.

2. The process of claim 1, in which step (i) is performed in the absence of fiber.

3. The process of claim 1, in which step (i) is performed in the presence of fibers.

4. The process of claim 1, in which step (ii) is performed under low-shear mixing conditions.

5. The process of claim 1, in which step (i) is carried out in the absence of added prefabricated foam.

6. The process of claim 1, in which step (i) is carried out in the presence of added prefabricated foam.

7. The process of claim 1, in which the slump of the slurry obtained at step (i), is at least 150 mm.

8. The process of claim 1, in which the slump of the slurry obtained at step (i), is from 200 to 250 mm.

9. The process of claim 1, in which, in the final set product, the pores volume created by water voids ranges from 20 to 65% vol and the cell volume created by injected air ranges from 3 to 50% vol.

10. The process of claim 1, in which, in the final set product, the total pore volume ranges is between 47 and 95% vol.

11. The process of claim 1, in which, in the final set product, the total pore volume ranges from 53 to 75% vol.

12. The process of claim 1, in which the cement further comprises at least one aggregate or at least one filler or both.

13. The process of claim 1, in which step (i) further comprises the step of retarding the setting of cement while step (ii) further comprises the step of accelerating the setting of cement.

14. The process of claim 1, which further comprises retarding the setting of the plaster and accelerating the setting of the plaster.

15. The process of claim 1, wherein the retarder comprises sodium polyacrylate and the accelerator comprises aluminum sulfate.

16. The process of claim 1, wherein the retarder comprises sodium phosphonate and the accelerator comprises zinc sulfate.

17. The process of claim 1, in which step (i) or step (ii) or both further comprises the step of adding a strength enhancing resin into the slurry.

18. The process of claim 17, in which the strength enhancing resin is a styrene-butadiene copolymer.

19. The process of claim 1, in which step (i) or step (ii) or both further comprises the step of adding a bubble stabilizing agent into the slurry.

20. The process of claim 1, in which step (i) or step (ii) or both further comprises the step of adding a water-soluble viscosity modifier into the slurry.

21. The process of claim 1, in which step (i) comprises two sub-steps (a) and (b), where sub-step (a) comprises the step of mixing the cementitious material, water, the retarder and optionally additives and sub-step (b) comprises the step of adding the foaming agent and the accelerator to the slurry of sub-step (a).

22. The process of claim 21, in which sub-step (a) is performed under high-shear mixing conditions.

23. The process of claim 1, which comprises, between step (i) and step (ii), a step of spreading the slurry of step (i) prior to the introduction of air.

24. The process of claim 1, in which step (iii) comprises the step of depositing said slurry on at least one moving facer to form a cellular core.

25. The process of claim 1, in which step (iii) comprises the step of depositing said slurry on at least one moving facer to form a cellular core and which further comprises diverting part of the slurry obtained in step (i) as a stream which is deposited to the cellular core.

26. The process of claim 1, in which step (iii) comprises the step of depositing said slurry on at least one moving facer to form a cellular core and which further comprises diverting part of the slurry obtained in step (i) as a stream which is deposited onto or beneath the cellular core or both.

27. The process of claim 24, in which the moving facer is paper.

28. The process of claim 24, further comprising the step of removing the facer after the cement has set.

29. The process of claim 24, in which the moving facer is a non-woven mat.

30. The process of claim 24, in which the moving facer is a non-woven glass mat.

31. The process of claim 1, in which step (ii) comprises the sub step of expanding air between injecting and distributing.

32. The process of claim 1, wherein, in the final set product, the total pore volume is about 83% vol.

* * * * *